Figure 1:
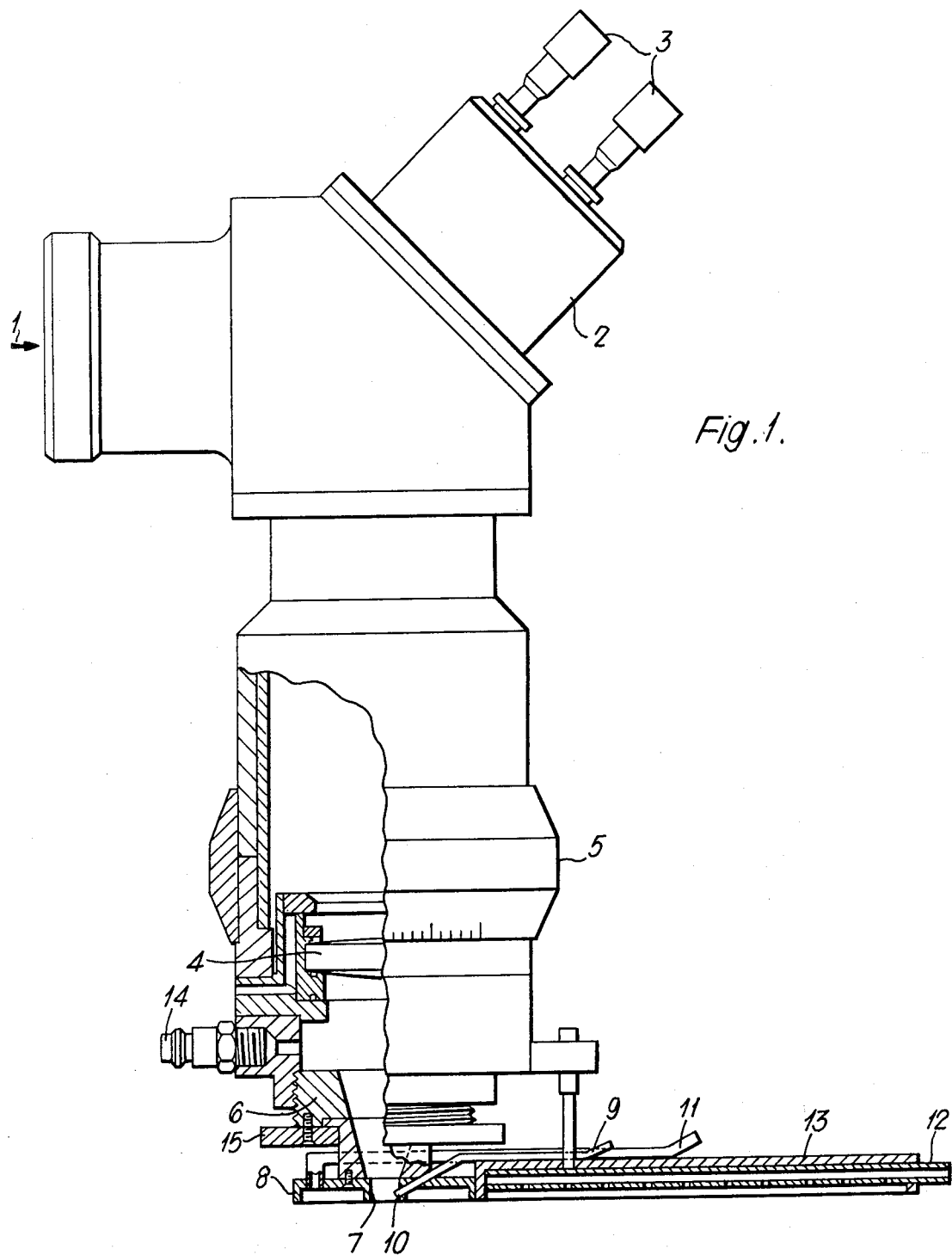

United States Patent [19]

Pauley et al.

[11] 4,127,761
[45] Nov. 28, 1978

[54] LASER WELDING

[75] Inventors: John T. Pauley; John D. Russell, both of Cambridge, England

[73] Assignee: The Welding Institute, Cambridge, England

[21] Appl. No.: 844,941

[22] Filed: Oct. 25, 1977

[30] Foreign Application Priority Data

Oct. 25, 1976 [GB] United Kingdom ............... 44269/76

[51] Int. Cl.² ............................................. B23K 9/00
[52] U.S. Cl. ......................... 219/121 L; 219/121 LM
[58] Field of Search ....................... 219/121 L, 121 LM

[56] References Cited

U.S. PATENT DOCUMENTS 3,860,784  1/1975  Brown et al. ................ 219/121 LM
4,078,165  3/1978  Tuttle .............................. 219/121 L Primary Examiner—J. V. Truhe
Assistant Examiner—Fred E. Bell
Attorney, Agent, or Firm—Sughrue, Rothwell, Mion, Zinn and Macpeak

[57] ABSTRACT

In laser-beam welding apparatus, a gas jet from a first gas conduit is directed at plasma created by the interaction of the laser beam and the workpiece material, the gas jet being adapted to blow the plasma into the weld zone, a second gas conduit providing shielding gas at the region of the crossover of the laser beam and the plasma-control jet to reduce the possibility of contamination or porosity of the weld zone into which the plasma is blown.

14 Claims, 2 Drawing Figures

LASER WELDING

In welding of metals with a laser, the penetration which is achieved may be limited by a plasma which is formed in the weld region. The plasma is produced by interaction of the laser beam with metal vapour and gases near to the workpiece. This limitation of penetration results from the scattering of the laser beam by the plasma and by the absorption of the beam by the plasma; although some of the absorbed beam energy is transmitted by conduction to the workpiece, the conducted energy does not result in deep penetration.

It is known to direct a tube, through which flows a jet of gas, obliquely at the area of intersection of the laser beam and workpiece, the object being to disrupt the plasma by means of the gas jet. Although this results in some improvement in penetration, the penetration still falls far short of what could be achieved in the absence of the plasma. It is also known in cutting by means of a laser to direct a gas jet at the area of intersection of the laser beam and workpiece, in order to blow away the molten or evaporated material.

Welding apparatus according to the present invention comprises means for directing a laser beam at a workpiece weld zone and means for directing a gas jet at the plasma created by the interaction of the laser beam and the workpiece material, the plasma control means comprising a first gas conduit leading to an outlet section with a cross-sectional area of not more than 19.6 mm$^2$ and arranged at an angle of 20° to 50° to the axis of the laser beam, the apparatus further comprising a second gas conduit, for shielding gas, leading to the region of the crossover of the laser beam and the plasma control jet to form a gas shield around the said crossover region, whereby the plasma is blown into the weld zone by the plasma control jet and the shielding gas substantially prevents contamination or porosity. A cross-sectional area of 19.6 mm$^2$ corresponds to a tube with a circular outlet of 5 mm diameter. Preferably the outlet is considerably smaller than this, not greater than 3.5 mm$^2$ and we find it most advantageous to use a tube not much greater than 1 mm diameter. The angle of this tube is preferably between 25° and 35° and in our preferred arrangement it is substantially 30°.

In a method embodying the present invention, the plasma-controlling gas is preferably helium. We have found that the best results are obtained when the plasma is blown right through the weld zone by the plasma control jet.

In the prior systems utilising plasma-controlling gas jet, the gas jet has been used to blow the plasma away over the surface of the workpiece. Even with this jet a large molten zone is formed at the top of the weld at low travel speeds, typically less than 25 inches per minute, and penetration is therefore limited. When a plasma-controlling jet outlet with the above-mentioned cross-section and arranged at an angle to the axis of the laser beam within the above-mentioned range of angles, is used, the gas jet blows the plasma into the weld zone. This leads to a welding "mechanism" which resembles in some respects those known types of welding (for example, electron beam welding and keyhole plasma arc welding) in which deep penetration takes place, that is to say the energy passes deep into the workpiece. In such processes it is believed that evaporation results in a depressed weld cavity maintained open by the interaction of the repulsion due to the evaporation and the surface tension forces which try to close the capillary. With the proposed invention it is thought that the capillary is also held open by reaction between liquid and gas jet in addition to vaporisation forces.

The recovery of heat from the plasma consequent upon the plasma being blown into the weld cavity improves the penetration obtained and affects the weld shape for a given power.

Using the method according to the present invention, welds can be performed at a slower speed than would be possible without the blowing of the plasma into the weld zone by the plasma-controlling jet whilst maintaining a narrow weld profile. Slow-speed welds are sometimes desirable and in fact certain materials (for example some structural steels) cannot be welded by lasers at high speed owing to cracking problems. Prior to this invention, laser welding was limited to speeds above approximately 25 inches per minute for high depth-to-width ratio welds. Using the invention, welds can be made at speeds as low as 10 inches a minute. The invention enables deeper welds to be made at a given power than would be possible without plasma control.

In the preferred form of apparatus embodying the invention a shielding gas is also supplied to a trailing hood to form a trailing shield, i.e. a cover of shielding gas following the weld and protecting the weld while it is still hot. These flows of shielding gas help to protect the weld from oxidation. Finally, in apparatus employing a lens, there may be a flow of gas through the end of the housing to protect the lens, this gas being also preferably an inert gas and forming an annular shield around the beam axis.

Thus, there are preferably four streams of shielding gas, all helping to prevent oxidation of the weld and all helping to ensure that the plasma generated is a plasma of the shielding gas together with some metal vapour and not in air. Such an arrangement permits the plasma to be controlled more easily and therefore permits much deeper penetration and additionally gives a clean weld.

It will be appreciated that the invention may be embodied in an attachment for a standard laser welder, the attachment including the housing and the tube for the controlling gas stream passing through the housing wall. This housing may also make provision for other gas streams, and in particular for an annular gas flow directed in the same direction as the laser beam and coaxial therewith to avoid entrainment of air through the top of the attachment.

Figure 2:
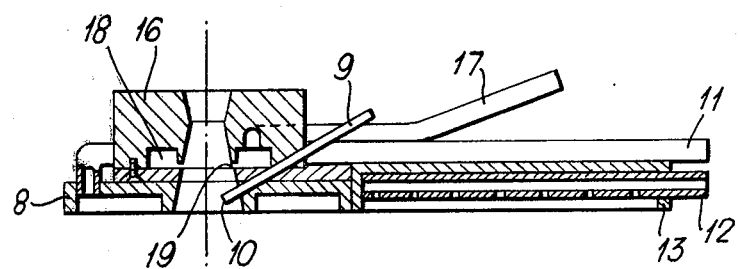

In order that the invention may be better understood, two examples of apparatus embodying the invention will now be described with reference to the accompanying drawings, in which:

FIG. 1 illustrates the welding head of a laser welder with integrated focusing system embodying the invention; and FIG. 2 shows an attachment for use with a laser welding head to form apparatus embodying the present invention with remote optics.

In FIG. 1, an unfocused laser beam entering the welding head in the direction of the arrow 1 is reflected by a 45° mirror (not shown) located in a mirror holder 2 and adjustable by means of mirror controls 3. The reflected beam travels towards a lens 4 which in this example has a diameter of 50 millimeters and which can be adjusted axially in the welding head by means of the ring 5. The beam, focused by the lens 4, passes through a nozzle 6, the internal cross-section of which tapers to a point close to the exit of the laser beam, at which point there is a short cylindrical section 7 surrounded by an annular housing 8. When the apparatus is in use, the end of the cylindrical section 7 and housing 8 may be as close at is practical to the workpiece and this is typically 1-3 mm.

A gas conduit 9 passes through the cylindrical section 7 of the nozzle. The end section 10 of this conduit constitutes the plasma control gas jet nozzle. In the example shown, the diameter is not greater than 2 millmeters but it will be appreciated that it is not essential to employ a conduit of circular section. Also in the example shown, the end section 10 of the gas conduit 9 makes the preferred angle of about 30° with the incident laser beam (60° to the horizontal) but can be varied within the range 20° to 50° (70° to 40° to the horizontal).

As previously explained, the plasma-control gas jet from the gas conduit 9 blows the plasma into the weld cavity resulting in heat transfer into the weld zone. The gas used is preferably helium. Preferably, the plasma is blown right through the weld zone, i.e. a full penetration weld is made with the jet exiting from the rear of the weld.

A gas conduit 11 communicates with the annular shield 8 surrounding the crossover of the laser beam and the emerging jet of gas from the end section 10 of the conduit 9. The gas which is supplied to the shield 8 through the conduit 11 is an inert gas and has for its purpose a reduced entrainment of air from the surrounding atmosphere, thereby substantially to prevent contamination and porosity in the weld zone into which the plasma is blown.

A third gas conduit 12 communicates with the open lower side of a trailing hood 13 to provide a trailing shield covering the weld for a short time after the weld has passed the laser beam. The gas supplied to the conduit 12 is also an inert gas.

Finally in the example shown, a gas inlet 14 leads directly into the nozzle 6 and the purpose of the gas flow through this passage is to protect the lens 4 and to provide an inert gas flow directly over the weld pool.

A ring 15 permits adjustment of the height of the lower end of the weld head with respect to the body of the weld head.

In FIG. 2, there is shown an alternative auxiliary shielding device for use with a conventional laser welder with remote focusing optics. This auxiliary shielding device is placed close to the workpiece. As in FIG. 1, the plasma-control gas conduit terminates in an end section 10 making an angle of about 40° with the axis of the nozzle 16 through which the laser beam passes, the lower end of the section 10 emerging close to the lower face of the nozzle 16. Once again, as in FIG. 1 there is a gas inlet 11 for supplying inert gas to an outer annular shield 8 and a gas conduit 12 for supplying inert gas to a trailing shield 13.

The fourth gas supply is rather different in FIG. 2. An inlet 17 leads to an annular chamber 18 coaxial with the axis of the nozzle 16, the inner wall of the annular chamber 18 having an annular slot 19 to permit gas to pass into the central space within the housing. The inner wall of the nozzle has a shape such that most of the gas passing into the central space from the annular chamber 18 is directed downward towards the workpiece. Some of the gas however, passes upwards within the central space and emerges through the open top of the nozzle shown in the auxiliary device of FIG. 2. This upwardly flowing gas reduces the entrainment of air through the open top of the auxiliary device and thereby helps to reduce oxidation of the weld area.

In both examples, the flow rate for the plasma control jet is preferably 2-10 liters/minute and the flow rate for each of the other gas supplies is 2-15 liters/minute. Because the diameter of the plasma control jet is relatively small its velocity is of course very much higher than that of the remaining gas flows.

Although in these examples a shield 8 of annular form has been shown, it would be possible to provide a gas outlet at one side of the crossover of the laser beam and plasma-control jet and to create a shielding gas flow across the weld area.

Use of the plasma-controlling devices described above with a 2Kw laser enables welds up to 5 mm deep to be made in steel.

We claim:

1. Welding apparatus comprising means for directing a laser beam at a workpiece weld zone and plasma control means for directing a gas jet at plasma created by the interaction of the laser beam and the workpiece material and in which:

said plasma-control means comprises a first gas conduit leading to an outlet section with a cross-sectional area of not more than 19.6 mm$^2$ and arranged to cross the laser beam at an angle of 20° to 50° to the axis of the laser beam;

the apparatus further comprising a second gas conduit, for shielding gas, leading to the region of the crossover of the laser beam and the plasma-control means to form a gas shield around the said crossover region, the shielding gas reducing the possibility of contamination or porosity of the weld zone into which the plasma is blown by the plasma-control means .

2. Apparatus in accordance with claim 1, in which the said outlet section of the first gas conduit has a cross-sectional area of not more than 3.5 mm$^2$.

3. Apparatus in accordance with claim 2, in which the said outlet section of the first gas conduit is arranged at an angle of between 25° and 35° to the axis of the laser beam.

4. Apparatus in accordance with claim 3, in which the angle of the said outlet section of the first gas conduit is substantially 30° with respect to the axis of the laser beam.

5. Apparatus in accordance with claim 2, further comprising a tubular member coaxial with the laser beam having an open end through which the laser beam emerges and an annular housing having a wall surrounding and spaced from the first tubular member and communicating with the second gas conduit and having an open exit end to provide the gas shield around the crossover region.

6. Apparatus in accordance with claim 5, in which the said first gas conduit passes through the said wall and terminates substantially flush with the said exit end of the annular housing.

7. Apparatus in accordance with claim 2, comprising a nozzle through which the laser beam emerges, a hood extending from the end of the nozzle and having a cavity facing the workpiece, and a further shielding gas conduit connected to supply shielding gas to said cavity, the hood functioning to provide a trailing shield for parts which have recently passed under the laser beam when the apparatus is in operation.

8. Apparatus in accordance with claim 2, further comprising a nozzle through which the laser beam passes and a shielding gas inlet communicating with the interior of the nozzle for providing a flow of gas directly over the weld zone.

9. Apparatus in accordance with claim 1, wherein each of the said gas conduits is connected to a source of helium gas.

10. Welding apparatus comprising means for directing a laser beam at a workpiece weld zone and plasma control means for directing a gas jet at plasma created by the interaction of the laser beam and the workpiece material, and in which:

said plasma-control means comprises a first gas conduit leading to an outlet section with a cross-sectional area of not more than 3.5 mm$^2$ and arranged to cross the laser beam at an angle of 20° to 50° to the axis of the laser beam; and in which the apparatus further comprises:

a second gas conduit, for shielding gas, leading to the region of the crossover of the laser beam and the plasma-control jet to form a gas shield around the said crossover region;

a third gas conduit, a nozzle through which the laser beam emerges, and a hood extending from the end of the nozzle and having a cavity communicating with the third gas conduit and facing the workpiece to provide a trailing gas shield when the apparatus is in operation;

and a fourth gas conduit communicating with the said nozzle to provide a flow of shielding gas through the nozzle directly over the said weld zone.

11. A method of welding workpieces in which a laser beam is directed at a workpiece weld zone and comprising:

directing a jet of inert gas from a first gas conduit towards the said weld zone from a tube the bore of which has a cross-sectional area of not more than 19.6 mm$^2$ and which is arranged to cross the laser beam at an angle of 20° to 50° to the axis of the incident laser beam to blow into the weld zone plasma created by the interaction of the laser beam and the workpiece material;

and directing a shielding gas from a second gas conduit to the region around the crossover of the laser beam and the plasma control gas jet to form a gas shield around the said crossover region.

12. A method in accordance with claim 11, in which the plasma-control jet blows the plasma through the rear of the weld zone.

13. A method according to claim 11, in which the gas supplied to the plasma-control gas conduit is helium.

14. In laser-beam welding apparatus, an auxiliary device comprising:

a nozzle open at each end to allow the passage of the laser beam through the nozzle to a workpiece weld zone;

plasma-control means for directing a gas jet at plasma created by the interaction of the laser beam and the workpiece material, the plasma-control means comprising a first gas conduit extending into the said nozzle and terminating within the nozzle in an outlet section with a cross-sectional area of not more than 19.6 mm$^2$ and arranged to cross the laser beam at an angle of 20° to 50° to the axis of the laser beam;

an annular channel surrounding the said nozzle and having an open end facing the workpiece; and a second gas conduit, for shielding gas, leading to the annular channel to form a gas shield around the crossover of the axis of the said nozzle and said plasma-control jet from the said first conduit, the shielding gas reducing the possibility of contamination or porosity of the weld zone into which the plasma is blown by the plasma-control jet.

* * * * *